United States Patent [19]

d'Alayer de Costemore d'Arc et al.

[11] Patent Number: 4,914,421

[45] Date of Patent: Apr. 3, 1990

[54] DETECTOR FOR DISC RECORDS

[75] Inventors: Stéphane M. A. d'Alayer de Costemore d'Arc, Genappe; Christiaan G. M. H. G. Van Damme, Leuven, both of Belgium

[73] Assignee: Staar S.A., Belgium

[21] Appl. No.: 308,541

[22] Filed: Feb. 10, 1989

[51] Int. Cl.⁴ .............................................. G08B 13/14
[52] U.S. Cl. .................................. 340/568; 369/77.2; 324/690
[58] Field of Search .......................... 369/77.2, 77.1; 340/568, 562, 572; 324/61 P, 61 R

[56] References Cited

U.S. PATENT DOCUMENTS

| | | | |
|---|---|---|---|
| 3,740,567 | 6/1973 | Atkins | 340/568 |
| 3,820,100 | 6/1974 | Ballinger | 340/568 |
| 4,063,230 | 12/1977 | Purinton | 340/558 |
| 4,293,852 | 10/1981 | Rogers | 340/568 |
| 4,317,112 | 2/1982 | Beier | 340/568 |
| 4,358,749 | 11/1982 | Clark | 340/568 |
| 4,365,240 | 12/1982 | Scarpino | 340/568 |
| 4,563,673 | 1/1986 | Fechner | 340/568 |
| 4,810,957 | 3/1989 | Rubbmark | 340/568 |

FOREIGN PATENT DOCUMENTS 1232352 2/1988 Canada.

Primary Examiner—Reinhard J. Eisenzopf
Assistant Examiner—Jose M. Solis
Attorney, Agent, or Firm—Leydig, Voit & Mayer

[57] ABSTRACT

A record detector includes a member having a capacitance that changes in response to capacitive coupling with a metallic layer of the record. The variable capacitance member controls an electrical oscillator that produces an electrical signal having a frequency that varies in response to the value of the capacitance. Changes in the frequency of the electrical signal are measured in analog or digital form. The magnitude of the frequency change is compared to one or more reference values to determine whether an optical disc record is present and to determine other characteristics, such as size and orientation, of an optical disc record. The variable capacitance member is constructed by applying one or more metallic plates to an optical disc record support, or to the periphery of an optical disc record insertion slot, that is part of an optical disc record playback unit.

35 Claims, 5 Drawing Sheets

DETECTOR FOR DISC RECORDS

TECHNICAL FIELD

The present invention relates to devices and methods for detecting the presence of disc records of the type including a metallic layer and for generating signals in response to the detection of the presence of a disc record.

BACKGROUND ART

In recent years, disc records in which recorded information is retrieved by reflection of a light beam have become popular. These optical disc records may be employed to store information, such as audio and/or video and data, in analog or digital format. Optical disc records include a metallic layer usually covered by a protective layer. Information is retrieved from an optical disc record by detecting light reflected from the metallic layer and decoding the reflected light to recover the information. Well known examples of optical disc records are "compact discs" and "video discs" on which audio and/or video information are recorded.

In two-sided optical disc records, a substantially equal thickness of a substantially transparent protective material is disposed on each side of the metallic layer. In a single-sided record, the protective material may be thicker on one side of the metallic layer than on the other. In that case, the protective material needs only to be transparent on the side of the metallic layer containing the recorded information.

Usually, the functions of playback apparatus for optical disc records are automated. For example, an optical disc record player may include a device for detecting the presence of a disc record. When a disc record is detected, the player automatically loads the record into its playback position. Likewise, the disc record player may not undertake to load a second record until its detector indicates a first record has been removed or until overriding manual instructions are provided.

A number of mechanical and optical devices for detecting the presence of an optical disc record in playback apparatus have been proposed. Mechanical detectors employ a physical contact to determine the presence of an optical disc record. Since optical disc records are susceptible to mechanical damage, the mechanical detectors can scratch the records, damage them, and interfere with information retrieval. The conventional optical detectors avoid a mechanical contact and usually function by sensing the reflection or interruption of a light beam by an optical disc record. These detectors employ infrared light and, as a result, are extremely sensitive to the precise position of the disc record relative to light beam sensors. Moreover, these optical detectors are relatively expensive, limiting their application, occupy a relatively large volume and must be precisely positioned for reliable performance.

Accordingly, it is desirable to provide a relatively low cost, dependable detector for detecting the presence and other characteristics of optical disc records.

DISCLOSURE OF THE INVENTION

An object of the invention is the provision of a simple, dependable, and inexpensive detector for detecting the presence and other characteristics of an optical disc record of the type having a metallic layer by employing the capacitive properties of the optical disc record.

Another object of the invention is the provision of an optical disc record presence detector that may be employed in playback equipment having a variety of different loading arrangements.

Still another object of the invention is the provision of a detection device for detecting the presence of an optical disc record which is reliable and does not require precise tuning for accurate performance.

A further object of the invention is the provision of a detector for detecting the presence of an optical disc record of the type having a metallic layer which can detect the relative size and orientation of the record.

The aims of the invention are achieved in an optical disc record detector including a capacitance that changes in response to capacitive coupling with the metallic layer of the record. The variable capacitance is part of an electrical oscillator that produces a first electrical signal having a frequency that varies in response to the value of the capacitance. Changes in the frequency of the first electrical signal are measured and their magnitudes are compared to one or more reference values to determine whether an optical disc record is present and to determine other characteristics of an optical disc record. The variable capacitance is constructed by applying one or more metallic plates to an optical disc record support or to the periphery of an optical disc record insertion slot on an optical disc record playback unit.

Changes in the frequency of the oscillator are, in a preferred embodiment, detected by comparing that frequency with a stable frequency signal produced by a second oscillator. That comparison, in a preferred embodiment, is employed to generate a third electrical signal having a frequency indicative of the amount of change in the variable capacitance. Preferably, that third electrical signal is filtered to provide a signal having an amplitude indicative of the amount of the change in the variable capacitance. In a particularly preferred embodiment, that amplitude variable signal is compared against one or more reference signals to indicate the presence, size, and orientation of an optical disc record.

In another preferred embodiment, changes in the frequency of the oscillator are digitally determined. The number of cycles of the signal produced by the oscillator are counted during a predetermined period and compared to reference counts to determine the presence or absence of an optical disc record, the size of the record, its orientation, and/or other characteristics.

Additional features and advantages of the invention will become evident from the following detailed description of preferred embodiments of the invention. Various additions and modifications within the spirit of the invention will occur to those of skill in the art. Accordingly, the scope of the invention is not limited by the described, preferred embodiments.

The invention may be more easily understood by reference to the drawings figures in which like elements are given the same reference numbers.

BEST MODE FOR CARRYING OUT THE INVENTION

Figure 1:
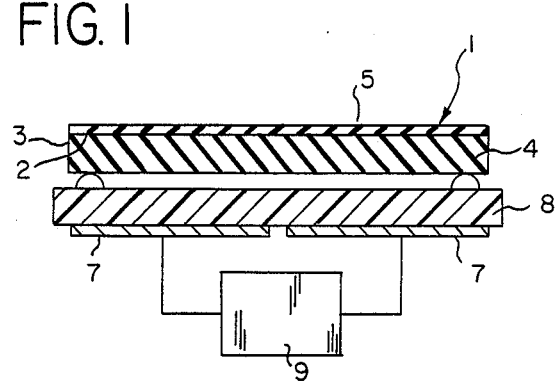
FIG. 1 illustrates, in a highly schematic manner, an embodiment of the invention.

In FIG. 1 a highly schematic side view of an embodiment of the invention is shown. There, an optical disc record 1 includes a metallic layer 2 on which information is recorded. The metallic layer 2 is embedded in a protective material 3 that is ordinarily electrically insulating. In FIG. 1, a onesided record is shown. In the one-sided record, the metallic layer 2 is asymmetrically disposed in the protective material 3. A relatively thick body 4 of the protective material 3 is disposed on the rear side of the record 1. A relatively thin layer of a protective material 5 is disposed on the front side of the record, i.e., the side onto which light is directed for retrieving recorded information. As explained below, the asymmetrical location of the metallic layer 2 permits a determination of the orientation of the record 1 (rightside up or upside down). Typically, compact discs employ an asymmetrically disposed metallic layer. By contrast, video discs typically have information recorded on both sides. In that situation the metallic layer 2 is disposed in the center of the disc record with substantially equal thickness protective layers disposed on opposite sides of the metallic layer.

In FIG. 1, the disc record 1 is supported from below by a support 8. On the reverse side of the support 8 two metal plates 7 are disposed. Each of those plates 7 is electrically connected to a circuit 9. In the invention, the circuit 9 includes an oscillator for generating an electrical signal having a variable frequency. The frequency of that signal is determined by the capacitance of a capacitor that includes plates 7. The value of that capacitance is affected by the interaction of the electric field produced at the plates 7 with the metallic layer 2 of an optical disc record that is disposed opposite the plates 7. As explained in detail below, the invention exploits the interaction between the metallic layer 2 and the metal plates 7 to determine when an optical disc record is present on the support 8, what the size of the record is, and, in the case of records with asymmetrically disposed metallic layers, what the orientation of the record is.

Figure 2A:
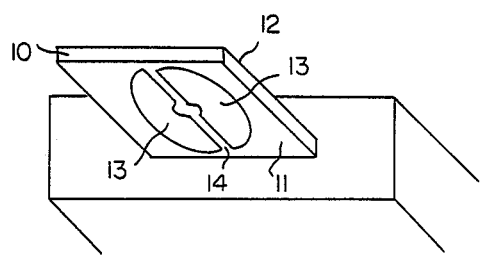
FIGS. 2a, 2b, and 2c pictorially illustrate arrangements of metallic plates of variable capacitance sensors that may be employed in embodiments of the present invention.
Figure 2C:
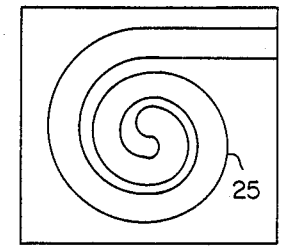
Figure 2B:
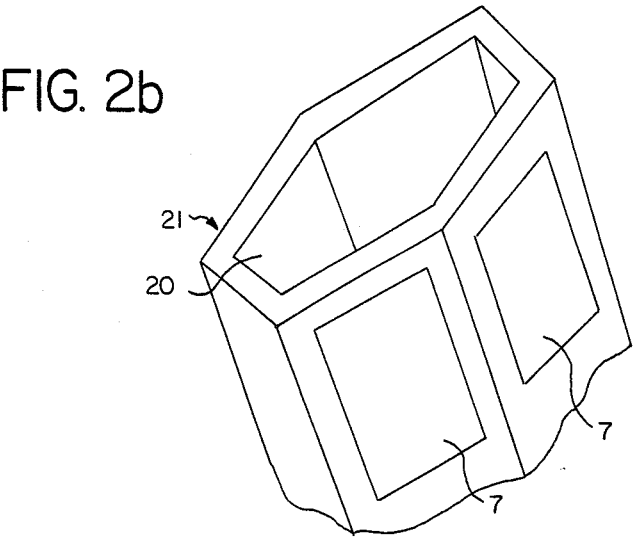

The geometry of the metal plates 7 is chosen to suit a particular application. Three such applications are shown in FIGS. 2a, 2b, and 2c. In each of those configurations, the metal plates may be a metallic paint, an evaporated metallic film, or a metal foil adhered in place. In FIG. 2a, a conventional compact disc player employing a drawer 10 for loading and unloading optical disc records is shown schematically from below. The drawer 10 includes a lower face 11 and an opposed face 12. An optical disc record is received on the face 12 for loading into the disc player for playback. Two generally semicircular metal plates 13, separated by a diametrically disposed gap 14, are disposed on the lower face 11 of the drawer 10. The plates 13 are disposed generally concentrically with an optical disc record when that record is properly loaded on the face 12 of the drawer 10.

The arrangement of FIG. 2b is particularly intended for disc players that employ an opening 20 through which an optical disc record is inserted in order to play it back. In this arrangement, the metal plates 7 are disposed side by side proximate the opening 20. In another configuration, two additional metal plates are also disposed on the opposite side 21 of the opening 20. This configuration is particularly advantageous since any inclination of a record being inserted in the opening 20 affects the plates in an opposite and compensating manner.

While the arrangements of FIGS. 1, 2a, and 2b are effective, it is not essential that two metal plates 7 (or 13) be employed in the invention. For example, in FIG. 2c a single spiral metal plate 25 is shown that may be employed on the underside of a disc player having a loading drawer. The use of a single metal plate generally requires that the wires between the plate and the detection circuit be kept as short as possible. Although the metal plate geometry of FIG. 2c has proven to be particularly reliable, it has not been useful in determining the size or orientation of an optical disc record.

Figure 3:
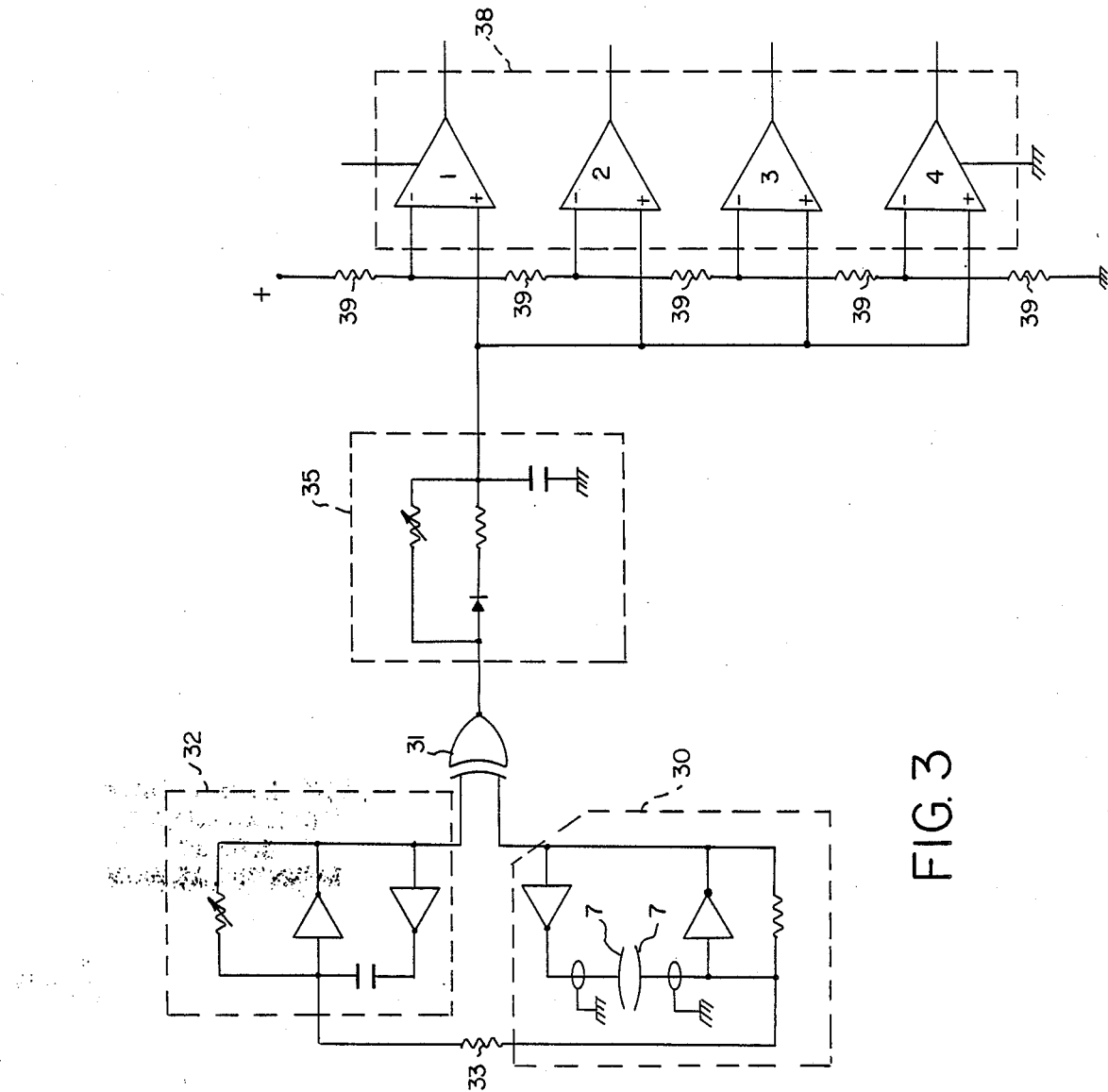
FIGS. 3, 4, and 5 are schematic electrical diagrams of circuitry that may be employed in embodiments of the invention.

In FIG. 3, circuitry for a preferred embodiment of the invention is shown. The metal plates 7 are shown as part of an oscillator circuit 30 that produces a variable frequency signal. The frequency produced depends upon the capacitance between the metal plates 7. That capacitance, in turn, depends upon what electrical conductors are disposed proximate the plates 7. In an intended application of the invention, whether an optical disc record is placed proximate plates 7 determines the frequency of the signal produced by the oscillator 30. That signal is connected to one of the two input terminals of an exclusive OR (XOR) gate 31.

A second oscillator 32 is essentially identical to the first oscillator 30, except it includes a fixed value capacitance in place of the variable capacitance of the first oscillator 30. The oscillator 32, therefore, generates a signal having a stable frequency. That output signal is connected to the second input terminal of the exclusive OR gate 31. Exclusive OR gate 31 compares the phases of the signals applied to its input terminals and generates an output signal indicative of the results of the comparison. Preferably, the signals produced by the oscillators 30 and 32 have the same frequency when no metallic material is placed proximate the plates 7. In addition to the similar frequencies, the phases of the signals produced by the oscillators 30 and 32 are maintained in constant relationship with each other through a phasing resistor 33 connecting the oscillators. In the detection apparatus according to the invention, it is preferred that the oscillators 30 and 32 produce trains of rectangular pulses rather than sinusoidal signals.

The exclusive OR gate 31 generates a high output signal whenever one of the two, but not both, of the signals supplied to the input terminals is high. Thus, when the oscillators 30 and 32 both produce signals of the same frequency and phase, the output signal produced by the exclusive OR gate is in its low state. When the variable capacitance of the first oscillator 30 changes, the frequency of the signal produced by the first oscillator 30 changes. As a result, the relative phase of the signals produced by the oscillators 30 and 32 changes. The exclusive OR gate 31 responds to the phase change by generating an output signal pulse train, the width of the pulses indicating the frequency change of the first oscillator 30. That is, the pulse train has characteristics that are indicative of the amount of the capacitance change at the plates 7.

The width of the pulses of the output signal produced by the exclusive OR gate 31 is converted into an amplitude characteristic in a pulse width detector 35. The pulse width detector 35 may have any one of the many known pulse width detector structures. The detector embodiment of FIG. 3 includes a series connected diode and resistor, a variable resistor connected across the series connected diode and resistor, and a capacitor connecting the two resistors to ground. The output signal from the pulse width detector, the amplitude signal, has an amplitude that represents the averaged amplitude of the pulse train output signal generated by the exclusive OR gate 31. A larger pulse width signal from the exclusive OR gate 31 produces a higher amplitude output signal from the pulse width detector 35.

The amplitude signal is applied to an input of a comparator 38 for comparison of its amplitude to the amplitude of a reference signal. When the amplitude of a particular reference signal is exceeded, the comparator produces a comparison signal that indicates the presence and/or a particular characteristic of an optical disc record that is disposed proximate the metal plates 7. In a preferred embodiment of the invention, the comparator 38 includes four separate comparator sections, each employing a separate reference signal for determining the presence and one or more characteristics of an optical disc record. Four-part comparators are conventionally available as integrated circuits. For example, in the LM 139/239/339 series circuit produced by National Semiconductor and schematically indicated as the comparator 38 in the circuitry of FIG. 3, four comparator sections permit the comparison of the amplitude of an input signal to four separate reference signals. In FIG. 3, those four reference signals are produced by a voltage divider connected between a power source and ground and comprising five series connected resistors 39. The results of the four comparisons can be used, with logic circuitry (not shown) if necessary, to provide various record indications.

Generally, when an optical disc record is placed proximate the plates 7, the frequency of the first oscillator 30 decreases. Thus, a change in the state of any output signal from any section of the comparator 38 indicates the presence of a record. Because the capacitive interaction is smaller, the frequency change is smaller when a small size (e.g., 80 millimeter diameter) optical disc record is present as compared to the frequency change when a larger (e.g., 120 millimeter diameter) optical disc record is present. The different frequency changes for different sized records produce two different amplitude signals from the pulse width detector 35. By properly adjusting the reference signals of two of the comparator sections, high level output signals will be produced by those two of the comparator sections when an optical disc record of a smaller size is present, while only one of those two comparator sections will produce a high level output signal when a larger size optical disc record is present. The comparator section responding to both of the larger and smaller size optical disc records also functions as an optical disc record presence indicator. These optical disc record size signals, individually or in combination, can be used directly or with additional logic circuitry (not shown) to actuate a signal light, a tone indicator, a disc player loading mechanism, a centering mechanism to ensure the proper loading of the optical disc record according to its size, and/or for like purposes.

In addition, when optical disc records having metallic layers asymmetrically embedded in a protective material are employed, the novel apparatus can determine and indicate the orientation of a record. When such an optical disc record, as shown in FIG. 1, is oriented on a support for playback, there is a relatively large spacing between the metallic layer 2 and the metal plates 7. This spacing produces a particular pulse width signal from the exclusive OR gate 31. When the optical disc record is upside down, the separation between the plates and the metallic layer is reduced. In that orientation, the capacitance is larger than when the optical disc record is oriented for playback. Therefore, the pulse width of the signal from the exclusive OR gate 31 is higher when an optical disc record is upside down than when the record is oriented for playback. As a result, different magnitude signals are produced at the output of pulse width detector 35, depending upon the orientation of the optical disc record. By adjusting the reference signals of two comparator sections in the four-part comparator 38, the output signals from those two sections can be employed to indicate when an optical disc record is inverted or properly oriented. As with the size discrimination signals, the orientation signals may be used individually or in combination to give a warning of an inverted record by actuating a signal light or tone indicator, etcetera.

Altogether, by generating up to four comparator signals, the comparator 38 can produce signals that indicate whether or not an optical disc record is present proximate the plates 7, whether a record that is present is of one size or another, and whether a record that is present is oriented for playback or is upside down. Those signals can be used to trigger operational or warning indicators, to actuate optical disc record loading, or for other purposes.

As is apparent from the foregoing discussion with respect to FIG. 3, additional comparator sections can be employed with additional reference signals to detect other or more detailed optical disc record characteristics. For example, the optical disc record detector may include additional comparisons to discriminate between more than two different sizes of optical disc records.

Figure 4:
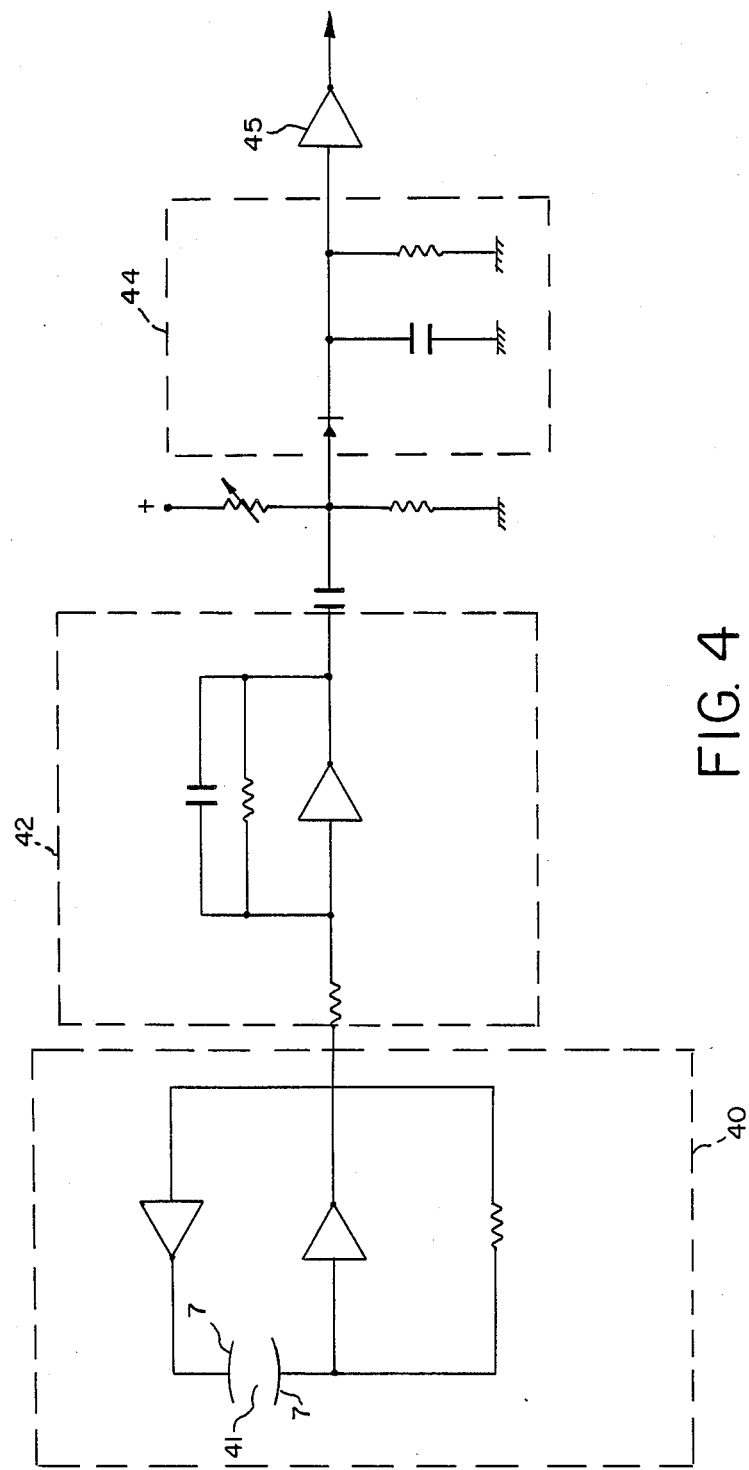
Figure 5:
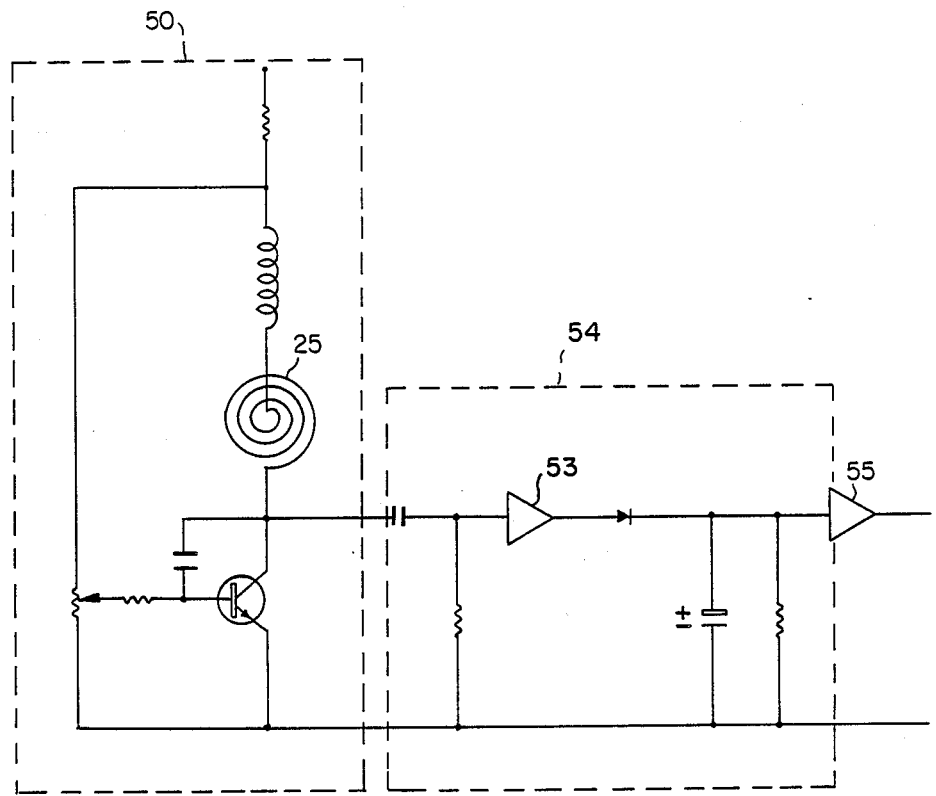

Other embodiments of the invention can employ simpler circuitry. For example, in FIG. 4, only a single oscillator 40 generating a variable frequency signal depending upon the capacitance at the plates 7 is used. When the capacitance of the capacitor 41 formed by the plates 7 increases, the frequency of oscillation of the signal produced by the oscillator decreases. That signal from the oscillator 40 passes through a frequency filter 42, preferably a low pass filter. The filter converts the frequency information into amplitude information that is applied as an input signal to a peak detector 44. The amplitude of the output signal of peak detector is proportional to the amplitude of the signal received by detector 44 from low pass filter 42. In FIG. 4, a comparator 45 receives the signal produced by peak detector 44. Comparator 45 is shown as a single unit, a four section comparator like that of FIG. 3 can be employed in the circuitry of FIG. 4. By using appropriate reference signals with each section of the comparator, the same information on optical disc record presence, size, and orientation obtained with the circuitry of FIG. 3 can also be obtained from the circuitry of FIG. 4. Although the circuitry of FIG. 4 is simpler than that of FIG. 3, it provides lower resolution. Still another embodiment of circuitry that may be employed in the invention, particularly with the spiral metal plate of FIG. 2c, is shown in FIG. 5. That circuitry includes an oscillator 50 incorporating a series connected inductor and the spiral metal plate 25 from FIG. 2c. The output signal from the oscillator is delivered to an amplifier 53 that is part of a low pass frequency filter 54. The output signal from the frequency filter is fed to an amplifier 55. As noted above, the spiral plate 25 lacks useful sensitivity to optical disc record orientation and size. However, when an optical disc record is placed on a support employing the spiral metal plate 25, the oscillation of the oscillator 50 stops and the signal produced by the amplifier 55 goes toward zero. This relatively large signal change at the amplifier 55 makes the circuitry of FIG. 5 highly reliable in detecting the presence of an optical disc record. As before, that information concerning the presence of an optical disc record can be employed to actuate a loading mechanism, to trigger a signal light or tone, or for other purposes.

Figure 6:
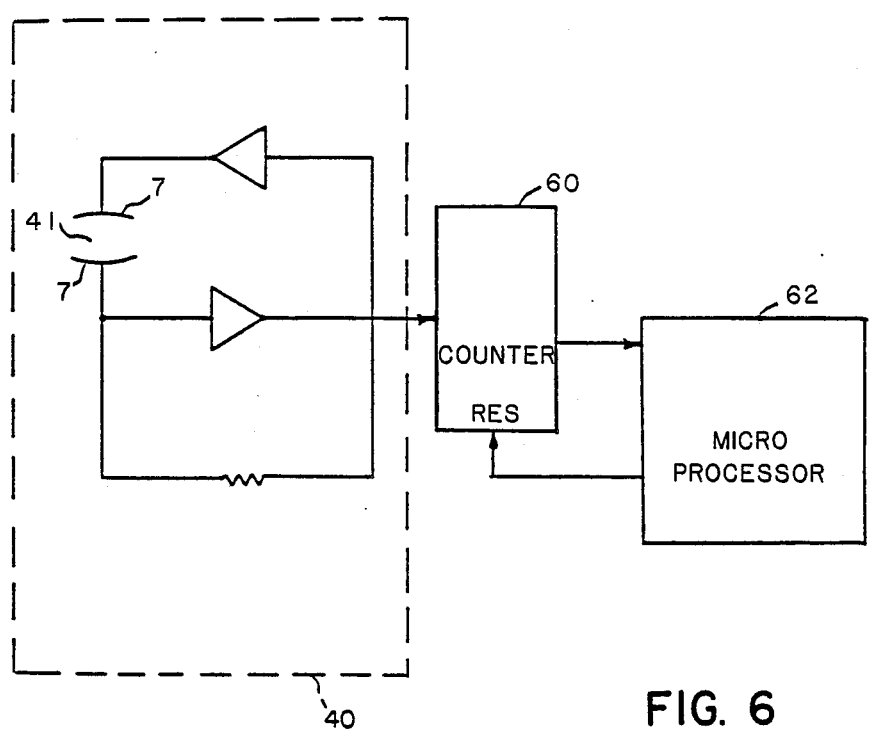
FIG. 6 is a schematic diagram of another embodiment of the invention.

In FIG. 6, another embodiment of the invention is shown in schematic form. In that embodiment, changes in the frequency of the oscillator are measured digitally. The same oscillator circuit embodiment 40 described with respect to FIG. 4 is employed to supply a variable frequency signal. That oscillator 40 includes plates 7 forming a variable capacitance 41. The frequency of the oscillator 40 is measured by a frequency counter 60 controlled by a digital circuit 62 which may be a microprocessor. The microprocessor 62 may be a dedicated portion of a microprocessor employed generally to control a compact disc player into which the capacitive detector is incorporated. Frequency counter 60 may be a portion of a microprocessor 62, such as the MC68HC11A8 microprocessor available from Motorola, or it may be a separate circuit, such as a 74HCT590 available from National Semiconductor.

At the beginning of a period of interest, a reset signal is applied to the frequency counter 60 in order to reset its count to zero. Upon the resetting of the count, counter 60 begins counting the cycles of the frequency generated by oscillator 40 during a predetermined period. At the end of that period, the cycle count is supplied to the microprocessor 62 where it is compared to a reference cycle count, i.e., frequency, to determine whether a record is present at the plates 7 and, preferably, the size of the record and its orientation. This embodiment of the invention offers the particular advantage that separate reference signals and comparators are not required to determine features other than the presence of the record. Because of the use of digital information, the amount of the frequency change is directly determined and can be compared in the execution of the microprocessor software to various reference frequency changes to determine record size and orientation information. Under the control of microprocessor 62, counter 60 may be repeatedly employed to determine the frequency of oscillator 40 so that accurate, timely information is obtained.

We claim:

1. A detector for detecting the presence or orientation of a record having a metallic layer comprising:
    a variable capacitance member which responds to the presence of a metallic layer of a record by changing capacitance;
    an oscillator controlled by the changing capacitance of said variable capacitance member to change state; and
    a circuit sensing the state of said oscillator to determine the presence or orientation of a record.

2. The detector of claim 1 including a second oscillator having a stable frequency and wherein said circuit for sensing state comprises means for comparing relative phases of first and second signals produced by said first mentioned oscillator and second oscillator, respectively.

3. The detector of claim 2 wherein said first and second signals have substantially the same frequency in the absence of a record and including an interconnection between both of said oscillators establishing a fixed phase relationship between the first and second signals in the absence of the record.

4. The detector of claim 2 wherein said means for comparing comprises an exclusive OR gate having first and second input terminals and an output terminal, said exclusive OR gate receiving the first and second signals at said first and second input terminals, respectively, and for generating a third signal indicative of the difference in the relative phases of the first and second signals.

5. The detector of claim 4 including means for producing an amplitude signal having an amplitude indicative of the phase difference between the first and second signals and comparator means receiving the amplitude signal for comparing the amplitude signal to a first reference signal and for generating a record presence signal in response.

6. The detector of claim 5 wherein said means for producing an amplitude signal comprises a pulse width detector.

7. The detector of claim 5 including means for determining the size of a record comprising second comparator means receiving the amplitude signal and a second reference signal, for comparing the amplitude signal and the second reference signal and for generating a record size signal in response.

8. The detector of claim 5 for detecting the presence or orientation of a record in which a metallic layer is asymmetrically embedded in a protective material comprising third comparator means receiving the amplitude signal and a third reference signal for comparing the amplitude signal and the third reference signal and for generating a record orientation signal in response.

9. The detector of claim 1 wherein said oscillator produces a first signal having a frequency that varies with the changing capacitance of said capacitance member and including means for filtering the first signal to produce a filtered first signal and means for producing an amplitude signal from said filtered first signal and wherein said circuit sensing the state of said oscillator comprises comparator means receiving the amplitude signal and a reference signal, for comparing the amplitude signal and the reference signal, and for generating a record presence signal in response.

10. The detector of claim 9 wherein said means for filtering is a low pass filter.

11. The detector of claim 9 wherein said means for producing an amplitude signal is a peak detector circuit.

12. The detector of claim 9 including means for determining the size of a record comprising second comparator means receiving the amplitude signal and a second reference signal, for comparing the filtered first signal and the second reference signal and for generating a record size indication signal in response.

13. The detector of claim 9 for detecting the presence or orientation of a record in which a metallic layer is asymmetrically embedded in a protective material comprising third comparator means receiving the filtered first signal and a third reference signal for comparing the filtered first signal and the third reference signal and for generating a record orientation signal in response.

14. The detector of claim 1 wherein said oscillator produces a first signal in the absence of a record and ceases producing the first signal when said variable capacitance member responds to the presence of a record.

15. The detector of claim 1 wherein said variable capacitance member comprises a support having opposed first and second sides, said first side for supporting a record and at least one electrical conductor disposed on said second side and electrically connected to said oscillator.

16. The detector of claim 15 wherein said conductor is arranged in a spiral configuration.

17. The detector of claim 15 wherein said conductor includes two electrically conducting plates spaced from each other and electrically connected to said oscillator.

18. The detector of claim 1 wherein said variable capacitance member comprises at least two electrically conducting plates electrically connected to said oscillator and disposed proximate an opening in a disc record player for the insertion of a record.

19. The detector of claim 1 wherein said circuit for sensing the state of said oscillator comprises a frequency counter and means for comparing the frequency measured by the counter to a reference frequency to disclose the presence of a record.

20. The detector of claim 19 wherein said means for comparing comprises a microprocessor.

21. The detector of claim 19 wherein said means for comparing compares the change in frequency to at least a second reference frequency to disclose at least one of record size and orientation.

22. A detector for detecting the presence, size and orientation of a record having a metallic layer comprising:
a support for supporting on a first of two opposed sides a record having a metallic layer embedded asymmetrically in a protective material;
at least one metal plate disposed on the second side of said support, said plate having an electrical capacitance that changes in response to the proximity of a record;
a first oscillator for generating a first signal having a stable frequency and phase;
a second oscillator electrically connected to said metal plate for generating a second signal having a phase that varies responsive to the changing capacitance of said metal plate;
a first circuit for comparing the phases of the first and second signals and for generating a third signal indicative of the phase difference between the first and second signals; and
second, third, fourth, and fifth circuit for comparing, each receiving the third signal and one of a first, second, third, and fourth reference signals, for comparing the third signal, respectively, to the first, second, third, and fourth reference signals and for generating signals respectively indicative of the presence of a record proximate said metal plate, the size of said record, and the orientation of said record.

23. The detector of claim 22 wherein the first and second signals have substantially the same frequency in the absence of a record and including an interconnection between said first and second oscillators for establishing a fixed phase relationship between the first and second signals in the absence of a record.

24. The detector of claim 22 wherein said first circuit produces the third signal having an amplitude indicative of the phase difference between the first and second signals and for applying the third signal to said second, third, fourth, and fifth circuits.

25. The detector of claim 24 wherein said first circuit for comparing phases includes an exclusive OR gate.

26. The detector of claim 25 wherein said first circuit for comparing phases includes a pulse width detector circuit receiving an output signal of said exclusive OR gate.

27. The detector of claim 22 including two metal plates spaced from each other and disposed on said second side.

28. A detector for detecting the presence of a record having a metallic layer comprising:
a support for supporting a record having a metallic layer;
at least one metal plate disposed on said support forming part of a variable capacitance capacitor, the metallic layer of a record forming a another part of the capacitor when a record is present;
an oscillator that produces an electrical signal that varies with the capacitance of said capacitor; and
a circuit for detecting changes in said signal to indicate the presence of a record having a metallic layer proximate said support.

29. The detector of claim 28 wherein said metal plate is arranged in a spiral configuration.

30. The detector of claim 28 wherein two metal plates are disposed on said support.

31. The detector of claim 28 including a second oscillator for generating a second signal having a stable frequency and wherein said circuit compares phase of the electrical signal generated by said oscillator with phase of the second signal.

32. The detector of claim 28 wherein said circuit for detecting changes comprises a frequency counter for determining the frequency and means for comparing the frequency to a reference frequency to determine the presence of a record.

33. The detector of claim 32 wherein said means for comparing includes means for comparing the frequency to a reference frequency to determine at least one of the size and orientation of a record proximate the support.

34. A detector for detecting the presence of a record having a metallic layer comprising:
a support for supporting a record having a metallic layer;
at least one metal plate disposed on said support forming part of a variable capacitance capacitor, the metallic layer of a record forming another part of the capacitor when a record is present;
an oscillator that produces an electrical signal having a frequency that varies with the capacitance of said capacitor; and
a digital circuit for detecting changes in the frequency to indicate the presence of a record having a metallic layer proximate said support.

35. The detector of claim 34 wherein said circuit for detecting changes comprises a frequency counter for determining the frequency and means for comparing the frequency to a reference frequency to determine the presence of a record.

* * * * *

UNITED STATES PATENT AND TRADEMARK OFFICE
CERTIFICATE OF CORRECTION

PATENT NO. : 4,914,421

DATED : April 3, 1990

INVENTOR(S) : d'Alayer de Costemore d'Arc et al

It is certified that error appears in the above-identified patent and that said Letters Patent is hereby corrected as shown below:

ON TITLE PAGE:

[30]   Foreign Application Priority Data

April 4, 1989   [BE]   Belgium ..........8800240

Signed and Sealed this

Tenth Day of September, 1991

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,914,421

DATED : April 3, 1990

INVENTOR(S) : d'Alayer de Costemore d'Arc et al

It is certified that error appears in the above-identified patent and that said Letters Patent is hereby corrected as shown below:

On the title page:

[30]   Foreign Application Priority Data

March 2, 1988  [BE]  Belgium ...........8800240

This certificate supersedes Certificate of Correction issued September 11, 1991.

Signed and Sealed this

Third Day of December, 1991

*Attest:*

HARRY F. MANBECK, JR.

*Attesting Officer*  *Commissioner of Patents and Trademarks*